United States Patent [19]
Bell

[11] Patent Number: 4,970,789
[45] Date of Patent: Nov. 20, 1990

[54] SPROCKET NOSE GUIDE BAR FOR CHAIN SAWS

[75] Inventor: Don A. Bell, Portland, Oreg.

[73] Assignee: Blount, Inc., Portland, Oreg.

[21] Appl. No.: 418,189

[22] Filed: Oct. 6, 1989

[51] Int. Cl.5 .......................... B23D 57/02; F16H 7/06
[52] U.S. Cl. ........................................ 30/384; 474/155
[58] Field of Search ................. 30/383, 384, 385, 386, 30/387; 474/155, 156, 157

[56] References Cited

U.S. PATENT DOCUMENTS

| | | | |
|---|---|---|---|
| 3,263,715 | 8/1966 | Dobbertin | 30/384 |
| 3,955,279 | 5/1976 | Pierson | 30/384 |
| 4,259,783 | 4/1981 | Jackson et al. | 30/384 |
| 4,796,360 | 1/1989 | Fischer et al. | 30/384 |

FOREIGN PATENT DOCUMENTS

| | | | |
|---|---|---|---|
| 0074207 | 3/1983 | European Pat. Off. | 30/384 |

*Primary Examiner*—Douglas D. Watts
*Assistant Examiner*—Paul M. Heyrana, Sr.
*Attorney, Agent, or Firm*—Robert L. Harrington

[57] ABSTRACT

A sprocket nose guide bar for guiding an endless saw chain. A configured sprocket is rotatably mounted in the nose of the bar and functions to elevate and transport the saw chain around the nose end. The teeth of the sprocket engage the drive links of the chain to lift the chain off the nose edge as the chain traverses the nose. The tooth tips project above the side link bearing surfaces and into configured notches whereby the teeth effectively provide the lifting action without entering the saw chain chassis.

4 Claims, 1 Drawing Sheet

SPROCKET NOSE GUIDE BAR FOR CHAIN SAWS

BACKGROUND OF THE INVENTION

1. Field of the Invention

This invention relates to chain saw guide bars and in particular it relates to an improved tooth configuration of an idler sprocket in the nose of the chain saw guide bar.

2. Background Information

Motorized chain saws have an elongate guide bar on which a saw chain travels. The bar is attached to a side of the housing of the chain saw power head with one end of the bar aligned with a drive sprocket that is driven by the drive shaft from the power head. The opposite end of the guide bar (referred to as the nose end) is generally semi-circular and it blends the top edge of the bar to the bottom edge.

The drive sprocket propels (pulls) an endless articulate saw chain around the guide bar. This occurs as a result of the sprocket teeth engaging depending portions of the saw chain referred to as drive tangs located on the center links of the saw chain (center drive links). The saw chain has, along its length, a plurality of alternating right and left hand cutter links that are side mounted in reference to the center drive links. Each cutter link is pivotally attached (by a pin or rivet) to a right or left side of the drive links. A tie strap link, having the same lower body configuration as the cutter link, is provided on the side of the drive links opposite the cutter links. The tie strap and cutter links, all being attached to the left or right hand side of the drive links are referred to collectively as side links.

Accordingly the saw chain sequence typically consists of alternating center drive links and interconnected pairs of side links, the side links being paired cutter links and tie strap links (a full house chain) or every other pair of side links may be paired tie strap links to space the cutters along the chain length (skip tooth chain). The center drive links travel in a peripheral groove in the guide bar to guide the saw chain as it travels around the bar. The pair of side links (a cutter link and a tie strap or a tie strap pair) of the saw chain ride in frictional contact on the side rails (edges) of the groove and thus provide the necessary bearing support for the chain during the cutting action. The bottom edge of the cutter links and the tie straps are notched between their pivotal mounting points to approximate a fit to the changing bar contour and to accommodate certain types of drive sprockets.

The highest rate of wear occurs at the nose section of the bar as the chain travels from the upper edge of the bar in a curvilinear path to the lower edge of the bar. To alleviate the wear rate and to aid in transporting the chain around the nose section, an idler sprocket or nose sprocket may be rotatably mounted in the nose of the bar. The nose sprocket is rotatable about an axis slightly forward of the center of the radius of the bar nose to smoothly engage and lift the saw chain. The nose sprocket has a different function and is not to be confused with the drive sprocket. The nose sprocket is propelled by the drive tangs of the saw chain's center drive links engaging the teeth of the nose sprocket. The sprocket is so positioned in the nose of the bar that it lifts the side links of the chain slightly off the rails as the chain traverses the nose of the bar.

In a conventional nose sprocket guide bar, each tooth of the sprocket enters between adjoining (front to back) drive links, with the tip of the tooth extending into the chassis of the chain. That is, the tip of the tooth is positioned between laterally opposite side links with the tooth tip extending above the top of the notch in the side links. This was heretofore thought to be a desirable feature to provide stability to the saw chain as it traveled around the bar nose.

The nature of the alternating right and left hand cutter links is such that in a cutting operation they exert lateral forces on the chain. These lateral forces tend to twist the saw chain as well as to laterally urge the saw chain out of its intended path. (The twisting and lateral forces are hereafter collectively referred to as "lateral forces".) In normal cutting conditions the drive tangs of the center drive links are entrained in the bar groove so that the engagement of the drive tangs with the groove walls absorbs the lateral forces. When the nose section of the bar is in the cut, the lateral forces are at least partially applied to the portion of the sprocket teeth tips projected between the side links. Sprocket teeth and bearings are unable to withstand these lateral forces and undue wear or breakage of the sprocket is common.

The lateral forces can also shove the saw chain and the sprocket teeth out of alignment at the point where the saw chain starts to mount the sprocket. The tip of the sprocket tooth in such an instance may then contact the bottom of a side link, lifting the chain further than intended so as to raise the drive tangs out of the bar groove. This condition can result in the chain being thrown off the guide bar. This can result in further damage to the chain saw and saw chain and may be a safety risk to the operator.

It was found that chamfering the tip of the sprocket aided the tip to "find" the opening between the side links for centering the chain on the bar nose. However, it was found that on occasion the chain and the sprocket could still get sufficiently out of alignment that the tip of the tooth, although chamfered, would come into contact with the bottom edge of a side link to cause the chain to jump off the bar as described.

The chamfering of the sprocket was an added operation during manufacture and of course added to the cost. The problem of the chain jumping off the bar because of the sprocket tooth tip engaging the bottom edge of the side link was reduced but not eliminated, and the problem of the sprockets having to bear the severe lateral forces during a nose cutting operation still resulted in rapid wear and breakage of the nose sprocket.

SUMMARY

The present invention eliminates the added process step of chamfering the tip of the sprocket and further eliminates the wear and breakage problem of the sprocket without sacrificing performance. The nose sprocket has configured teeth that achieve the desired lifting of the chain off the bar nose rails but without the danger of engaging the side link bottom edges. The sprocket teeth are configured to "fit" the opening defined by a leading and following drive tang in the condition where the saw chain is wrapped around the bar nose. The teeth project between the drive tangs to engage the flanks of the drive tangs just below the bottom of the side links. The teeth have no portion projected up between the side link pairs in normal operation. Thus, the lateral force resulting from the saw chain side links engaging the sprocket teeth is avoided. If misalignment does occur, any lifting that results is no more than what occurs in normal operation and the sprockets cannot thus be the cause of the drive tangs being lifted out of the bar groove.

DESCRIPTION OF THE PREFERRED EMBODIMENT

Figure 1:
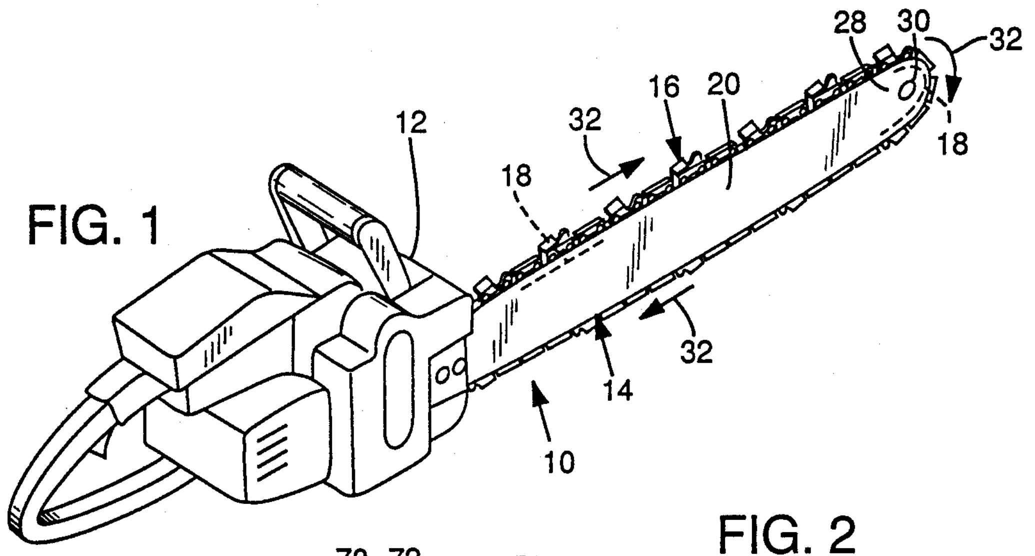
FIG. 1 is a drawing of a motorized chain saw in accordance with the invention.

With reference to the drawing figures, a chain saw 10 includes a power head enclosed by a housing 12 and an elongated guide bar 14 attached to the housing 12. An articulated endless saw chain 16 is guided in a peripheral groove 18 formed in the peripheral edge of the guide bar 14. At the nose 28 of the guide bar 14 an idler sprocket 30 (see FIG. 2) is rotatably mounted between side laminates 20, 22 of the guide bar 14. A center laminate 21 spaces the laminates 20, 22 to form the cavity for the sprocket 30 and also forms the bottom of guide groove 18. The side laminates 20,22 have a top edge 24, a nose edge 25, and a lower edge 26. The idler sprocket 30 is rotatably mounted on bearings 44 running on an inner face 45 secured between the side laminates 20,22 in the nose 28 of the guide bar 14.

In operation the saw chain 16 is propelled by a drive sprocket (not shown) in the direction indicated by arrows 32. This occurs as a result of the sprocket teeth engaging depending portions of the saw chain referred to as drive tangs 56 located on the center links 50 of the saw chain (center drive links). The saw chain has, along its length, a plurality of alternating right and left hand cutter links (46 and 48, respectively) that are side mounted in reference to the center drive links 56. Each cutter link 46, 48 is pivotally attached (by a pin or rivet) to a right or left side of the drive links 50. A tie strap link 54, having the same lower body configuration as the cutter link (46 or 48), is provided on the side of the drive links 50 opposite the cutter links 46, 48. The tie strap 54 and cutter links 46, 48, all being attached to the left or right hand side of the drive links 50, are referred to collectively as side links.

The sprocket 30 has a plurality of equally spaced, radially extending, symmetrical teeth 34. Gullets 42 are formed between adjacent teeth 34 to accept the drive link tangs 56 of the saw chain 16. Each tooth 34 has a leading face 36 and a trailing face 38, the faces 38, 36 of adjacent teeth providing supportive landing areas for the flanks of each saw chain drive link 50. The sprocket teeth 34 are configured to elevate the side links of saw chain 16 off the nose edge 25 as the saw chain 16 traverses the nose end 28 of the guide bar 14. Note the travel path 27 of the bottom edges of the side links 46, 48, 54.

At the point of entrance where the saw chain 16 first encounters the sprocket 30, the leading flank 58 of the drive link 50 engages (abuts) a trailing face 38 of a sprocket tooth 34. Further movement of the saw chain 16 rotates the sprocket 30 and the depending tang 56 of the drive link 50 enters the gullet 42 between the teeth 34. The trailing flank 60 of the drive link 50 then abuts the leading face 36 of the following tooth 34. Thus the drive link 50 of the saw chain 16 is supported on the faces 38, 36 of adjacent teeth 34 as the saw chain 16 traverses the nose 28 of the guide bar 14. From the perspective of the teeth 34, each tooth is projected between leading and following drive tangs whereby a leading tooth face 36 engages the trailing flank 60 of leading drive tang, and the following tooth face 38 engages the leading flank 58 of a following drive tang.

Figure 2:
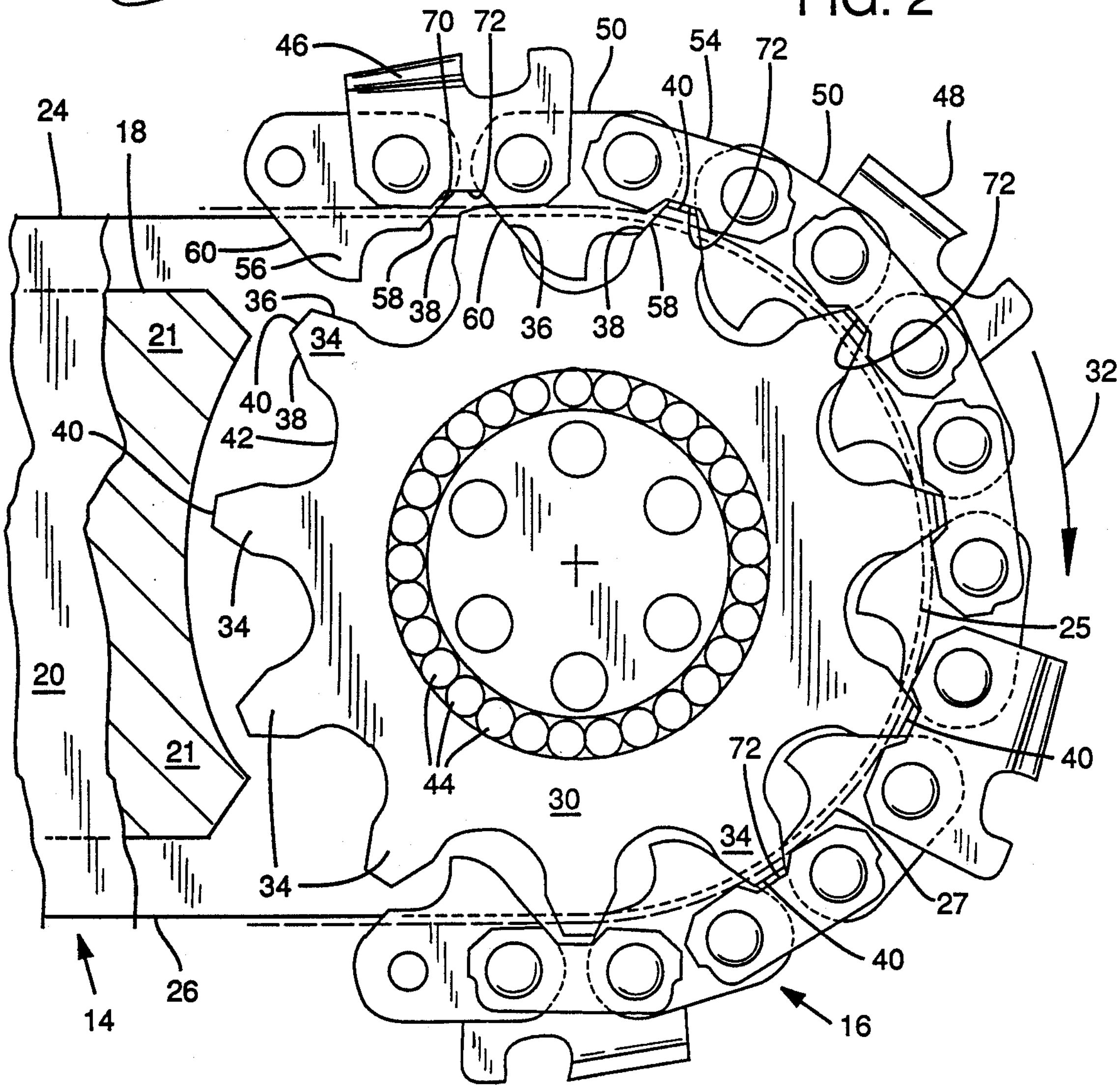
FIG. 2 is a section view of the nose portion of the sprocket nose guide bar of the chain saw in FIG. 1.

The abutment of the drive link flanks 58, 60 with the faces 38, 36 of adjacent teeth 34 elevates (lifts) the saw chain side links off of the nose edge 25 of the side laminates 20, 22 as indicated by path 27 in FIG. 2. Path 27 of the bottom edges of the side links, both prior to and after engagement with the sprocket teeth 34, merges with the edges 24, 26 of the side laminates. This merging varies depending on chain tension and is not illustrated in FIG. 2. The bottom edges of the side links will travel in close proximity to the nose edge 25. The tip 40 of the sprocket tooth 34 remains below the top 72 of the notch 70 which forms the bottom edge configuration in the side links.

The invention herein is based in part on the realization that attempting to improve lateral stability of the saw chain as it travels around the bar nose by projecting the teeth of the sprocket into the chain chassis (between the side links), creates more of a problem than it solves. In order to achieve the lifting action without projecting the teeth between the side links, the sprocket teeth need to be configured to match the formed configuration of the leading and following drive tang flanks 60, 58 as the drive links conform to the curved surface of the bar nose.

With a tooth 34 fully seated against the formed configuration of the drive tangs, the tooth faces 36, 38 must engage drive tang flanks 60, 58 respectively at a position whereby the tooth tip 40 does not project up between the side links i.e. it is spaced below the side links. The procedure for producing the tooth configuration and matching drive tang configuration is illustrated in FIG. 2. The curve of the bar nose edge 25 is laid out, e.g. in a drawing like that of FIG. 2. Then the desired travel path 27 of the bottom edge of the saw chain passing around the bar nose is produced on the drawing. A saw chain configuration matching the curved path 27 is laid out to thereby establish the formed configuration of the drive tang and also the configuration of the bottom edge of the side links including notch 70. The sprocket tooth configuration is then drawn to match the formed configuration of the drive tangs, achieving the desired surface to shank contact for optimum lifting action. The tooth is shaped so that the tooth terminates below the point where the tooth tip would be projected between the side links, i.e. in spaced relation inwardly of the notch top 72 as shown. Care is also taken to avoid of the tooth tip between the center links.

Variations and modifications will be apparent to those skilled in the art without departing from the scope of the invention. The scope is therefore not to limited by the embodiment set forth but is established by the appended claims.

What is claimed is:

1. In a chain saw, a power head driving a drive sprocket, a guide bar having a slotted guide bar edge defining a slot and side rails, said guide bar edge aligned with the drive sprocket for guiding a saw chain in a path from the drive sprocket to the bar end and around the bar end back to the drive sprocket, and a saw chain mounted on the drive sprocket and along the slotted bar edge to be driven around the guide bar and drive sprocket for cutting, said saw chain including center drive links and laterally opposed side links, said center drive links having drive tangs that project into the slot of the guide bar edge to maintain lateral stability of the saw chain on the bar, and said side links having bottom edge surfaces that engage the side rails of the guide bar to absorb the impact of cutting forces, said guide bar having an idler sprocket with outwardly projected teeth mounted in its nose end for lifting the saw chain side links off the guide bar side rails as the saw chain travels around the bar nose end, and the improvement that comprises, the nose sprocket teeth configured to match the formed configuration of adjacent drive tangs as the saw chain travels in a curved path around the nose end of the bar, said configured teeth having leading and trailing contact faces that contact the trailing flank and leading flank of the respective leading and trailing drive tangs to lift the saw chain and thereby the side links of the saw chain off the bar rails, and all of said configured teeth tips terminating in spaced relation inwardly of the bottom edge of all of said side links.

2. In a chain saw as defined in claim 1, said side link bottom edge is notched to form a center bottom relief area and said sprocket tooth tip projects into the relief area and terminates inwardly of the configuration of the notch.

3. A method of producing a sprocket nose guide bar comprising;

(a) generating a facsimile of a bar nose of a guide bar to which a nose sprocket is to be fitted, (b) laying out the desired path of travel of the bar edge of a saw chain in relation to the bar nose configuration, (c) generating a saw chain facsimile of a section of the desired saw chain to be guided by the guide bar in a cutting action, said saw chain facsimile conforming to the path of travel laid out around the bar nose configuration, and said saw chain configuration comprised of center drive links having depending tangs and interconnected pairs of side links, (d) designing a nose sprocket to fit the bar nose configuration with all of the sprocket teeth fitted between the depending tangs and terminating in spaced relation below the bottom edge of all of the side links.

4. A method as defined in claim 3 wherein the saw chain configuration includes a side link bottom edge configuration that includes a center notch, and wherein said sprocket teeth are projected into the notch and spaced inwardly of said notch configuration.

* * * * *